United States Patent
Brid (10) Patent No.: US 7,143,340 B2
(45) Date of Patent: Nov. 28, 2006

(54) ROW SHARING TECHNIQUES FOR GRID CONTROLS

(75) Inventor: Regis L. F. Brid, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 453 days.

(21) Appl. No.: 10/609,314

(22) Filed: Jun. 27, 2003

(65) Prior Publication Data

US 2004/0268227 A1 Dec. 30, 2004

(51) Int. Cl.
*G06F 17/00* (2006.01)
*G06F 15/00* (2006.01)

(52) U.S. Cl. .................. 715/504; 715/503; 715/509
(58) Field of Classification Search .......... 715/504, 715/503, 509
See application file for complete search history.

(56) References Cited

U.S. PATENT DOCUMENTS

| | | | | |
|---|---|---|---|---|
| 5,594,898 A | | 1/1997 | Dalal et al. | 395/602 |
| 5,781,896 A | * | 7/1998 | Dalal | 707/2 |
| 5,944,605 A | | 8/1999 | Pajitnov | 463/9 |
| 5,970,506 A | * | 10/1999 | Kiyan et al. | 715/503 |
| 6,060,358 A | * | 5/2000 | Bracchitta et al. | 438/259 |
| 6,157,389 A | * | 12/2000 | Knowlton | 345/660 |
| 6,360,213 B1 | * | 3/2002 | Wagstaff et al. | 707/1 |
| 6,442,575 B1 | | 8/2002 | Pratley et al. | 707/503 |
| 6,631,497 B1 | * | 10/2003 | Jamshidi et al. | 715/514 |
| 6,665,442 B1 | * | 12/2003 | Sekiguchi et al. | 382/224 |
| 6,668,092 B1 | * | 12/2003 | Sriram et al. | 382/244 |
| 6,671,854 B1 | * | 12/2003 | Dunsmoir et al. | 715/513 |
| 6,675,351 B1 | * | 1/2004 | Leduc | 715/503 |
| 6,865,720 B1 | * | 3/2005 | Otani et al. | 715/503 |
| 2001/0004739 A1 | * | 6/2001 | Sekiguchi et al. | 707/100 |
| 2004/0019590 A1 | * | 1/2004 | Hladik, Jr. | 707/3 |
| 2005/0021539 A1 | * | 1/2005 | Short et al. | 707/100 |
| 2005/0035784 A1 | * | 2/2005 | Gould et al. | 326/46 |

OTHER PUBLICATIONS

Kimball, Ralph; Drilling Down, Up, and Across; Mar. 1996; DBMS online.*
Driesen, Karel and Holzle, Urs; "Minimizing Row Displacement Dispatch Tables,"; OOPSLA '95: Conference on Object Oriented Programming Systems Languages and Applications; October 1995; vol. 30, No. 10; p. 141-155.
Hoenig, Stefan and Wingo, Scot; "Extending MFC,"; *Dr. Dobb's Journal*; Jan. 1996; vol. 21, No. 1; p. 58-59, 62-64 and 100-101.
Schultes, Stan and Barlow, Chris; "Manipulate Data with VB6's New Grid Control,"; *Visual Basic Programmer's Journal*; Nov. 1998; Vol. 8, No. 13; p. 78-80.

* cited by examiner

*Primary Examiner*—Doug Hutton
*Assistant Examiner*—N Hillery
(74) *Attorney, Agent, or Firm*—Workman Nydegger (57) ABSTRACT

A grid control for displaying a table with columns and rows is provided that reduces memory requirements by sharing a single row characteristic object between multiple row objects. The grid control can create a template row object that includes various characteristics used in presenting the underlying data within each cell of the row. This template can then be shared among other rows with similar characteristics. An index can also be used for linking the shared rows to the template row characteristic object.

47 Claims, 6 Drawing Sheets

ROW SHARING TECHNIQUES FOR GRID CONTROLS

CROSS-REFERENCE TO RELATED APPLICATIONS

N/A

BACKGROUND OF THE INVENTION

1. The Field of the Invention

The present invention generally relates to grid or table controls. More particularly, the present invention provides methods and apparatus for reducing memory requirements for a grid or table control by sharing a single row characteristic object between multiple row objects.

2. Background and Relevant Art

Databases are widely known and commonly used to collect data in an organized fashion so that its contents can be easily accessed, managed and updated. Databases contain aggregations of data records or files, such as sales transactions, product catalogs and inventories, and customer profiles. Databases are prevalent in large mainframes, smaller distributed work stations, mid-range systems, personal computers, etc.

A typical database includes a set of tables containing data for pre-defined categories. Each table may contain one or more data rows and columns. Rows contain unique instances or records of the data for categories defined by the columns. For example, a business order entry database might include a database table that describes a customer with columns for name, account number, address, phone number and so forth. Another database table might describe an order with columns for product, customer, date, sales price, and so forth. Each single piece of data (such as the account number) is a data field or cell in the database table.

Figure 1:
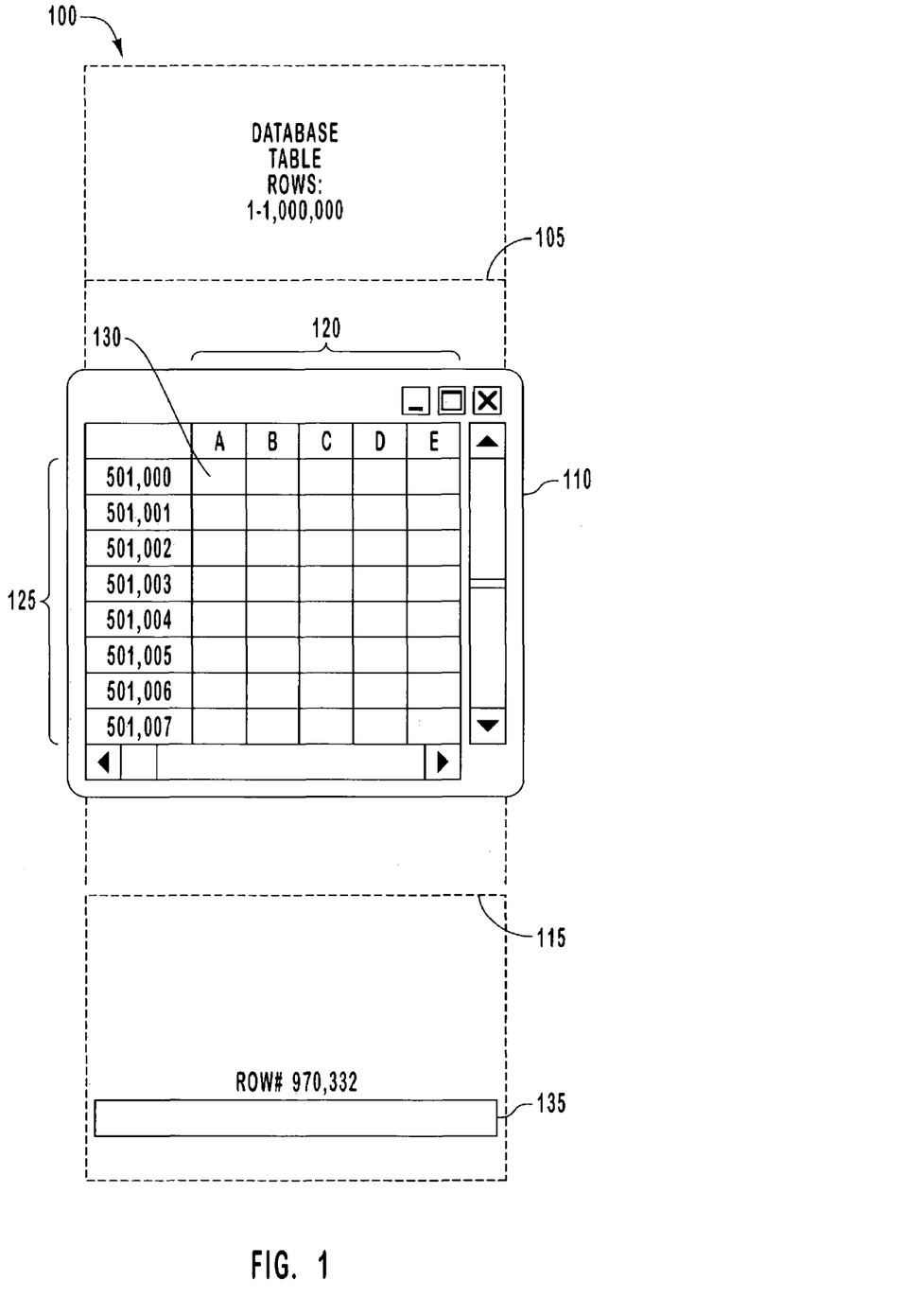
FIG. 1 illustrates a basic grid control used to display data from a database table.

Data grid or table controls are commonly used to display the data fields from the database table in a grid-like fashion. The grid controls display the database fields or cells in an organized fashion, and allow the user to interact and view those portions of the database. For example, FIG. 1 illustrates a basic Grid Control 110 used to display data from a large Database Table 100, which has one million rows. As shown in FIG. 1, Grid Control 110 displays Columns 120 and Rows 125 which make up a grid of individual Cells 130 that contain data from Database Table 100.

One common performance concern for grid or table controls is memory consumption. When a grid control is dealing with a database having a large number of rows, such as Database Table 100 which has a million rows, the corresponding memory allocations often result in memory-swapping between the random access memory (RAM) and the hard drive. Accordingly simple interaction with the user, such as scrolling from row to row or from page to page, can become slow and tedious for the grid or table control.

Because of the above performance degradation for common grid controls, there currently exists various attempts to increase grid control performance. For example, one technique attempts to anticipate what rows will be viewed next and only allocate memory for those rows. One example of this technique, allocates memory not only for the rows displayed but also for an amount (e.g., full screen) of rows just above and below the currently displayed set of rows. FIG. 1 illustrates an example of this technique, wherein Grid Control 110 allocates memory for those rows just above 105 and just below 115 Grid Control 110. These areas of memory allocation 105 and 115 are commonly referred to as an extended window, and although they may slightly improve the overall scrolling capabilities of the grid control there is no mechanism that effectively allows a user to instantaneously access a row outside the visible or extended window. For example, if a user is presently looking at row 501,000 and wishes to access row 970,322 (shown as row object 135), because this row is not in memory the grid control must go to the backend database and retrieve all characteristic and data for the particular row object 135. (Memory requirements generally prohibit a grid control from keeping an entire database of this size in memory at one time.)

Accordingly, there exists a need for a grid or table control that can enhance the user interaction experience by allowing instant access to any row within the database table, while reducing memory requirements.

BRIEF SUMMARY OF THE INVENTION

In accordance with exemplary embodiments of the present invention, the above-identified drawbacks and deficiencies of current grid or table controls are overcome. For example, exemplary embodiments provide for a grid control for displaying a table with a plurality of cell objects organized as a plurality of row objects and column objects. Each of the plurality of row objects have user interface characteristics that are stored in one or more row characteristic objects. The present invention provides for a methods and computer program products for reducing memory requirements for the grid control by sharing a single row characteristic object between two or more row objects.

For example, the present invention provides a grid control for creating a first row object that includes a plurality of cell objects. This first row object can be used in organizing the plurality of cell objects and data associated with them for presentation within the grid control. Further, the grid control provides for creating a second row object that also includes a plurality of cell objects and is used in organizing the plurality of cell objects and data associated with them for presentation within the grid control. A row characteristic object for use in determining how the data associated with the plurality of cell objects should be presented within the grid control is created. Finally, an index is created to link the row characteristic object to the first and second row-objects, such that the row characteristic object is shared between the first and second row objects.

In accordance with another example embodiment of the present invention, a grid control is provided for reducing memory requirements for the grid control, again by sharing a single row characteristic object between two or more row objects. This embodiment provides for organizing cell objects and data associated with the cell objects within a first row object for presentation within the grid control. Next, cell objects and data associated with them may be organized in a second row object for presentation within the grid control. Finally, a single row characteristic object can be shared between the first and second row objects. The row characteristic object may be used in determining how the data associated with the cell objects should be presented within the grid control. An index can also be used to link the row characteristic object to the first row object and the second row object.

In accordance with yet another example embodiment the present invention provides for creating column objects associated with the cell objects. The cell objects can also include cell characteristics for use in presenting the data associated with them Accordingly, the cell characteristic information may be determined by either the row characteristic object or the column characteristic object.

In accordance with yet still another example embodiment of the present invention, a computer program product that implements a grid control for displaying a table that includes a plurality of cells, organized as a plurality of row objects and one or more column objects is provided. The computer program product is used in reducing memory requirements for the grid control by sharing a single row characteristic object between a plurality of row objects. This example embodiment provides for a routine that creates a row characteristic object, which includes user interface characteristics used in presenting data within one or more cells. Another routine is provided that adds a plurality of row objects to the grid control table. The added row objects share the row characteristic object for presenting data within the cells of the plurality of rows. A third routine is also provided that creates an index linking the row characteristic object to the plurality of row objects.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention cam be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for reducing the memory requirements of a grid control. The embodiments of the present invention may comprise a special purpose or general-purpose computer including various computer hardware, as discussed in greater detail below.

Figure 2:
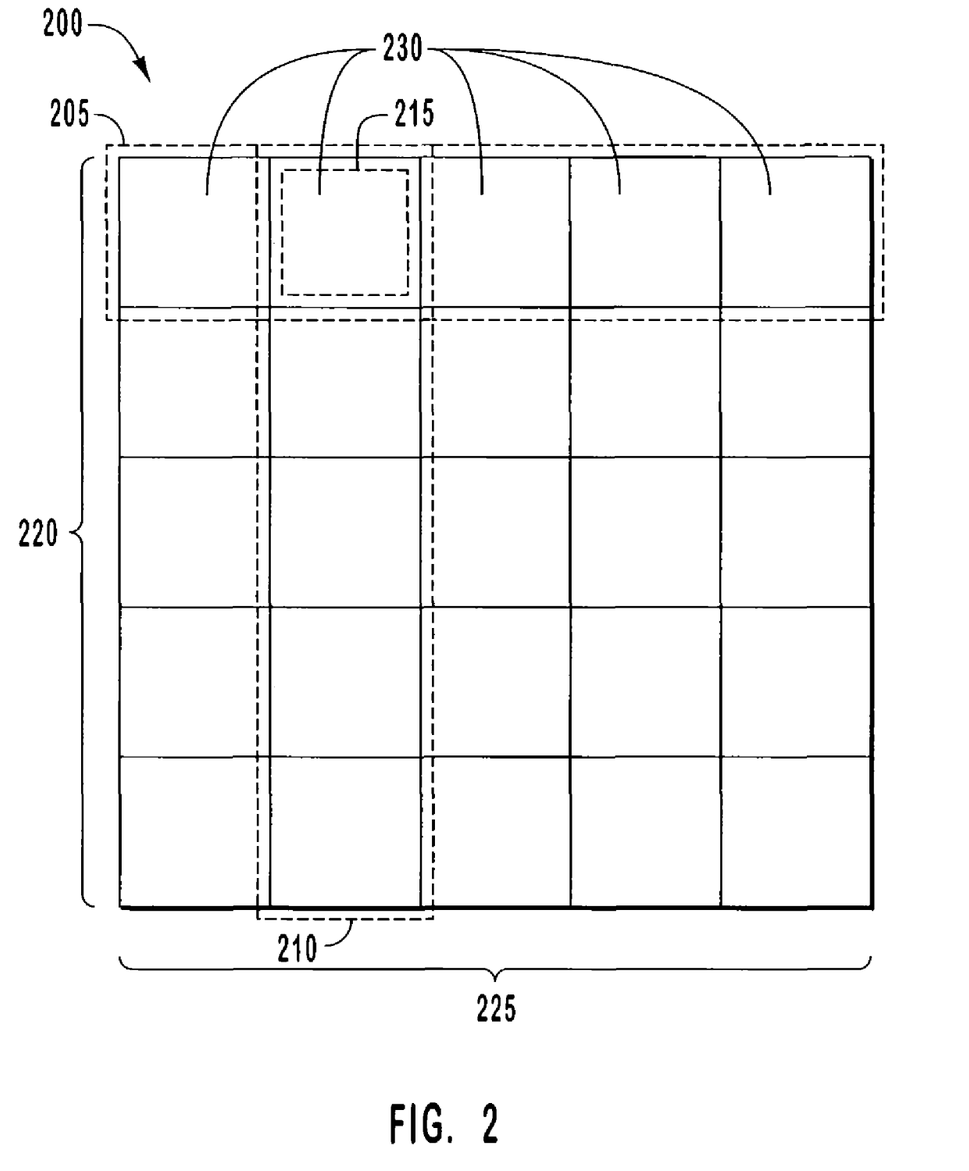
FIG. 2 illustrates a basic object model for a control table in accordance with example embodiments.

In accordance with example embodiments, a grid control or table control is provided, which is building block for another application's interaction with the database. A user interface (UI) provides a visual representation of the table in the database allowing the user to read and interact with the database by viewing, updating, adding, deleting or otherwise changing information within the database. FIG. 2 illustrates an example of a basic object model for a Control Table 200 in accordance with the present invention. Control Table 200 uses the concept of a collection, which is a set of individual objects. For example, a Table Row Object 205 represents one row within a Collection of Rows 220. Similarly, Table Column Object 210 represents an individual column within a Collection of Columns 225. Table Cell Object 215 is an individual intersection between a Table Row Object 205 and a Table Column Object 210. Accordingly, Table 200 is composed of a Collection of Columns 225 and a Collection of Rows 220, and each Row Object 205 is composed of a Collection of Cells 230.

Example embodiments of the present invention provide for properties that allow a user to access individual rows, columns and cells. For example, the Table Row collection 220 allows a user to access an individual Table Row Object 205. Similarly, the Table Column Collection 225 allows a user to access an individual Table Column Object 210 within Table 200. Individual Row Object 205 will also allow a user to access an individual Cell Object 215 within the Table Cell Collection 230. Because these features allow a user to access any object within a table database, using the row sharing technique described below a user may immediately access any row, column and/or cell characteristic outside the UI or extended visual representation of the database table.

Each individual Object 205, 215, 210 within Control Table 110 contains characteristics that include formatting and state information for the underlying data associated with each individual cell. For example, an individual Table Row Object 205 may contain formatting information describing the physical characteristics for displaying the underlying data such as the height of the row and various styles for the underlying data. The styles might include, e.g., background row color, foreground color, data alignment, data wrapping, data font name, data font size, data font style, etc. In addition to the formatting information, an individual Table Row Object 205 can have characteristics describing whether various states within the Table Row Object 205 are on or off. These states may include read-only, selected, resizable, frozen, visible, enabled, etc. In other words, these states describe such things as whether the underlying data within the individual Cells 215 of the Collection of Cells 230 is read-only/read-write, or describe physical characteristics such as whether the Table Row Object 205 is selected or not, resizable or not (i.e., user can resize height), frozen or not (i.e., whether the Row Object 205 will move as the user scrolls through data), visible or not, (i.e., hiding the subset of rows that can be expanded), etc.

As mentioned above, characteristics for objects within Table 200 can extend not only to individual Row Objects 205, but also to individual Column Objects 210 and Cell Objects 215. For example, an individual Column Object 210 within a Collection of Columns 225 may have characteristics comprising formatting information and state information similar to those described above with regard to Table Row Object 205. The one obvious difference between the characteristics for Table Row Object 205 and Table Column Object 210 is that the formatting information for Table Column Object 210 can have a width rather than height. Similar to characteristics describe above regarding Row 205 and Column Object 210, an individual Table Cell Object 215 may contain characteristics such as height, width, styles and states. In addition, the Cell Object 215 may include a value, which describes the underlying data content of a particular Cell 215. As discussed in greater detail below, however, if a cell includes a value, the row containing that cell will typically not be shared since the underlying data cannot be deduced from the characteristics of its owning row or column object.

Because of the concerns of memory consumption for a collection of a large amount of Row Objects 205, example embodiments allow for sharing Table Row Object's 205 characteristics among a plurality of rows within the Collection of Rows 220. As will be described in greater detail below, a Row Object 205 can be shared if the characteristics for each individual Cell Object 215 within a Collection of Cells 230 of the Row Object 205 can be deduced from the owning Row Object 105 and owning Column Object 210. For example, if Cell Object 215 has a state that is selected, then either Column Object 210 and/or Row Object 205 must also be selected in order for the characteristics of Row Object 205 to be shared among several rows. By contrast, if Column Object 210 is unselected and Row Object 205 is also unselected, but Cell 215 is selected then the characteristics of Row Object 205 cannot be shared and memory must be allocated for representing the instance of Row Object 205. As will be discussed in greater detail below, various actions from the user may un-share a row, and once a row is un-shared it cannot then become shared again.

Figure 3:
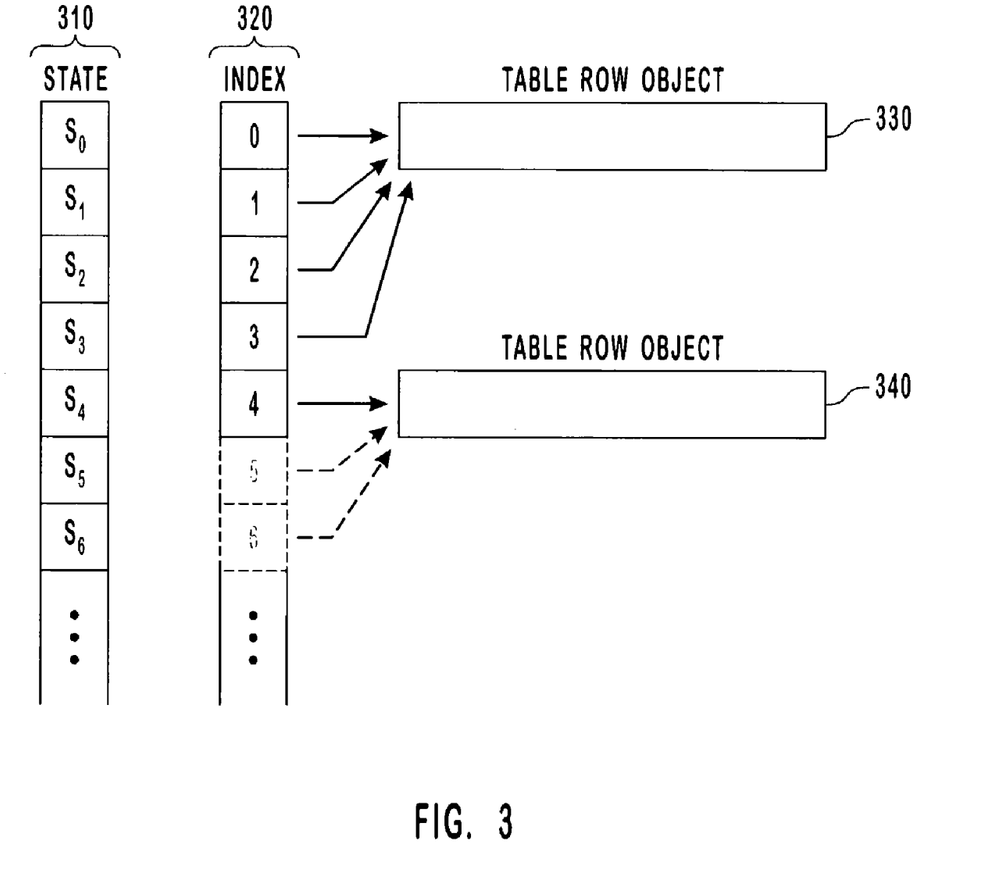
FIG. 3 illustrates an implementation of sharing table row characteristics object in accordance with the example embodiments.

FIG. 3 illustrates an implementation of sharing characteristics of a Table Row Object 330 in accordance with the example embodiments. As shown in FIG. 3, memory can initially be allocated for a Table Row Object 330, which contains characteristics such as the formatting and state information described above. Rows that have similar characteristics, i.e., those rows with cells that can be deduced from the owning table column object (not shown) and/or Row Object 330 may call to the same memory Table Row Object 330 to share characteristic information (used in presenting the underlying data for the individual cells) described therein. For example, as shown in FIG. 3, the rows with indices 1, 2 and 3 may have similar characteristics to Table Row Object 330; and therefore, may have links (e.g., a pointer, reference, etc.) that point to the memory for Table Row Object 330 for sharing the characteristics thereof. In other words, the Table Row Object 330 becomes the template for all other rows that share its characteristic information.

Example embodiments provide that when a table row object is shared, the underlying data associated with the individual cells within the table row object should be stored somewhere other than within the cell object. For example, the value information might be retrieved from the backend database or from local memory other than where characteristic information for the cell object is located. This will typically be the case since the cells within a shared table row object are deduced from the owning column and row objects. Because underlying value data within a cell may differ from row to row, column to column and cell to cell, this information cannot typically be deduced by an owning row or column object. Accordingly, this information will typically be stored outside the cell object characteristic information.

Example embodiments also provide that each shared table row object 330 can be identified by a unique row index, e.g., [−1]. This unique table row index will normally be transparent to any developer. In particular, if a developer accesses a particular table row object, e.g., requesting its index, the link sharing the table row object can be broken and memory allocated to represent the table row object. All of the characteristics from the shared row object are then copied into the new memory allocation, and an index reflecting the actual index of the row object can be shown back to the developer. For example, if index 4 in Index List 320 initially shared characteristics with Table Row Object 330, and a developer requests the index number of Table Row Object 340, memory would be allocated for Table Row Object 340. The link to Table Row Object 330 could then be broken and the characteristics of Table Row Object 330 can be copied into Table Row Object 340.

Along with requesting an index number for a shared row, there may be other ways in which a user's or developer's interaction with a shared row will unshare the properties thereof. For example, if a user wishes to change any of the characteristics in a particular shared row, the row will typically become unshared before manipulation to the characteristics may be done. As discussed in greater detail below, however, not all user interaction with the characteristics of a shared row will unshare it. Nevertheless, as mentioned previously, once a table row object is unshared, example embodiments provide that the table row object will typically remain unshared. That is, if a cell object within a table row object is incompatible with its owning row or owning column, then the table row object becomes unshared and the owning row can no longer be a shared row. It should be noted that in general, whenever a developer accesses a shared row belonging to a row collection, that row will be unshared. Reading the index of a row is just one way, among many others, to access a row.

It should be noted, however, that even though example embodiments provide that a table row object once unshared can no longer be a shared row, other rows that are added may share the characteristics of the unshared table row object. For example, as shown in FIG. 3, Table Row Object 340 may add rows with indices 5 and 6 that can use table row object as a source for their underlying table row characteristics. Example embodiments further provide that when a table row is added to the collection of rows it is initially shared. Any shared row can then become unshared through certain user interactions. For example, table row becomes unshared when a user requests for its index, or changes the background color or any other manipulation to the various characteristics of the row that deviate from the source row object.

Nevertheless, example embodiments attempt to keep rows shared as often as possible. Accordingly, the present invention also provides for a State List 310 as shown in FIG. 3. The State List 310 is an additional copy of the rows' states (e.g., integer of flags representing the read-only, selected, enabled, sizable, frozen, visible status). Because a source Table Row Object, e.g., 330, includes state information also, this duplication State List 310 of state information will typically contain the actual states of the rows. At the row level, a shared row has an unknown state, while an unshared row has the actual state. This feature allows a user to change the state of a particular row without unsharing the particular row. For example, exemplary embodiments provide that the mere selecting of a row will not alter its shared status. Similarly, changing the state of the row from read-only to read/write, freezing a row, enabling a row, or making the row sizable, or visible will not force a row to become unshared. Although, this introduces some data duplication, the ability to be able to change the states of a shared row without unsharing it is worth the additional memory allocation.

As mentioned previously, in order for a row to be shared the characteristics of each individual cell within the collection of cells for the row object must be able to be deduced from the owning columns and owning row object. As one of ordinary skill in the art would recognize, Boolean operands may be used to determine the inherent characteristics of the individual cells within the owning row object. For example, the read-only state for a column object and row object can be ORed in order to compare the inherent characteristics of a cell with its actual characteristics. If the inherent characteristics and actual characteristics are compatible the row can become shared, otherwise it must be unshared. Similar Boolean operands exist for comparing the inherent characteristics of the owning row and column to the cell objects its actual characteristics.

The present invention may also be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 4:
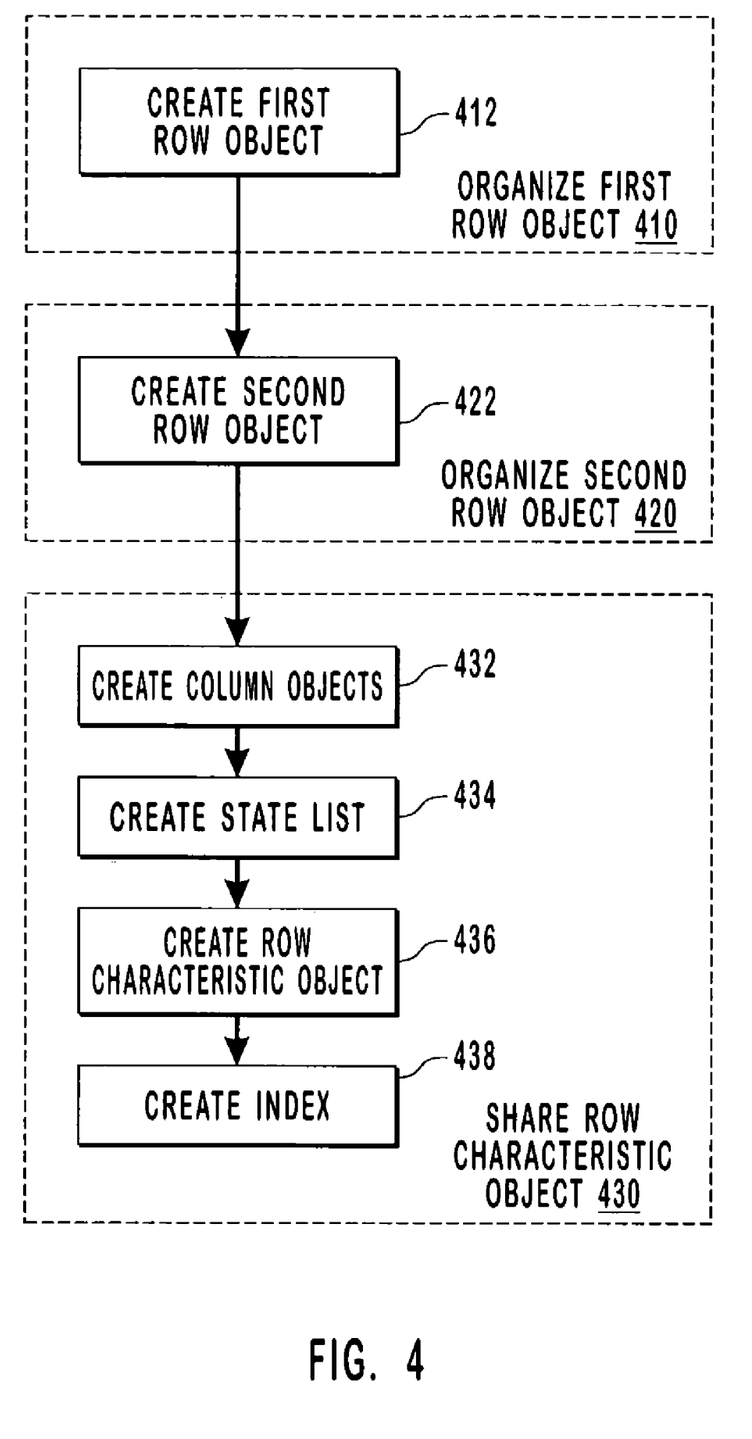
FIG. 4 illustrates example acts of and steps for methods of reducing memory requirements for a grid control in accordance with exemplary embodiments.

FIG. 4 illustrates example steps and acts used to reducing memory requirements for a grid control by sharing a single row characteristic object between two or more row objects. A step for Organizing a First Row Object 410 by organizing one or more first cell objects and data associated therewith, within the first row object for presentation within the grid control, may include the act of Creating a First Row Object 412 that includes one or more of the first cell objects. Similarly, a step for Organizing a Second Row Object 420 by organizing one or more second cell objects and data associated therewith within a second row object may include the act of Creating a Second Row Object 422 that includes one or more second cell objects.

A step for Sharing a Row Characteristic Object 430 between the first and second row objects may include the acts of Creating a Row Characteristic Object 436 and Creating an Index 438. The row characteristic object can be used in determining how the data associated with the one or more first and second cell objects should be presented within the grid control. The row characteristic object may contain presentation information describing, e.g., a row height, row style or row state. For example, the row style could include row background and foreground coloring, data alignment, data wrapping, data font name, data font size, data font style, etc. The row state within the characteristic object presentation information may be one of a read-only, selected, resizable, enabled, frozen or visible state. Further, the index can link the row characteristic object to the first and second row objects such that the row characteristic object could be shared between the first and second row objects.

In another example embodiment, the above step for Sharing a Row Characteristic Object 430 may also include an act of Creating Column Objects 432 associated with the one or more first and second cell objects. A cell characteristic for each of the one or more first and second cell objects can be used in presenting the data associated with the one or more first and second cell objects and determined by either the row characteristic object or the column characteristic object.

In yet another example embodiment, the above step for Sharing a Row Characteristic Object 430 may also include the act of Creating a States List 434. The states lists may include first and second states for the first and second row objects, respectively. Further, the row states may include information such as read-only, selected, resizable, frozen, enabled or visible, which can be either turned on or off.

Figure 5:
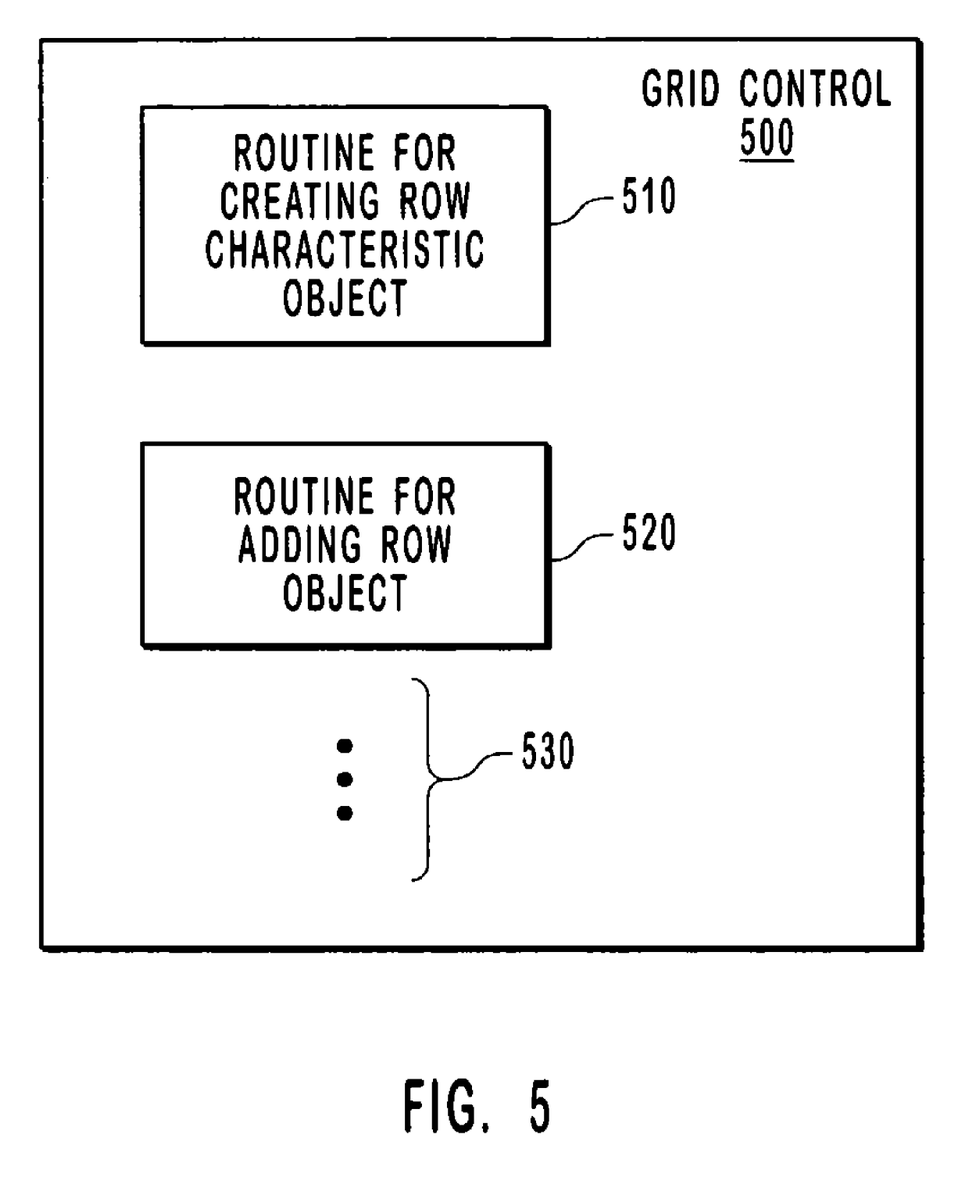
FIG. 5 illustrates a computer program product used in reducing memory requirements for a grid control in accordance with example embodiments.

FIG. 5 illustrates a computer program product in accordance with example embodiments of the present invention. The computer program product implements Grid Control 500 in accordance with the present invention for displaying a table that includes a plurality of cell objects organized as a plurality of row objects and one or more column objects. For each of the plurality of row objects, user interface characteristics are stored in a single row characteristic object. The Grid Control 500 includes a Routine 510 for creating a row characteristic object. As mentioned previously, the row characteristic object includes user interface characteristics used in presenting data within the cells of a particular row, which the row characteristic object is associated with.

A second Routine 520 may also be provided for adding a row object to the grid control table. The added row object then shares the row characteristic object with the particular row object, such that the row characteristic object is used for presenting data within one or more cells of both the added and particular rows. Further, an index may be created linking the row characteristic object to the plurality of row objects. Another example embodiment provides that Routine 510 uses at least one column object for creating the row characteristic object. Further, other embodiments provide for creating a states list that includes states for the added row objects.

Example implementations for adding rows with certain routines described above in connection with FIG. 5 are provided in Table I below.

TABLE I int Add( )
   Appends a new row to the collection based on the Columns collection
      of the table.
   Returns the index of the newly created row.
   This method creates a shared row. It is convenient for creating the
      very first row of the table.
int AddCopy( )
   Appends a new row to the collection based on the row at index 0 (the
      template row).
   Returns the index of the newly created row.
   This method creates a shared row.
int AddCopy(int indexSource)
   Appends a new row to the collection based on the row at the given
      index (the template row).
   Returns the index of the newly created row.
   This method creates a shared row.
int AddCopies(int count)
   Appends 'count' new rows to the collection based on the row at
      index 0 (the template row).
   Returns the index of the last newly created row.
   This method creates shared rows.
int AddCopies(int indexSource, int count)
   Appends 'count' new rows to the collection based on the row at
      the given index (the template row).
   Returns the index of the last newly created row.
   This method creates shared rows.
int InsertCopy(int indexSource, int indexDestination)
   Inserts a new row to the collection based on the row at the given index
      indexSource (the template row).
   Returns the index of the newly created row, which should be
      indexDestination.
   This method creates shared rows.

TABLE I-continued

```
int InsertCopy(int indexSource, int indexDestination, int count)
  Inserts 'count' new rows to the collection based on the row at
    the given index
  indexSource (the template row)
  Returns the index of the last newly created row, which should be
    indexDestination+count-1.
  This method creates shared rows.
```

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 6:
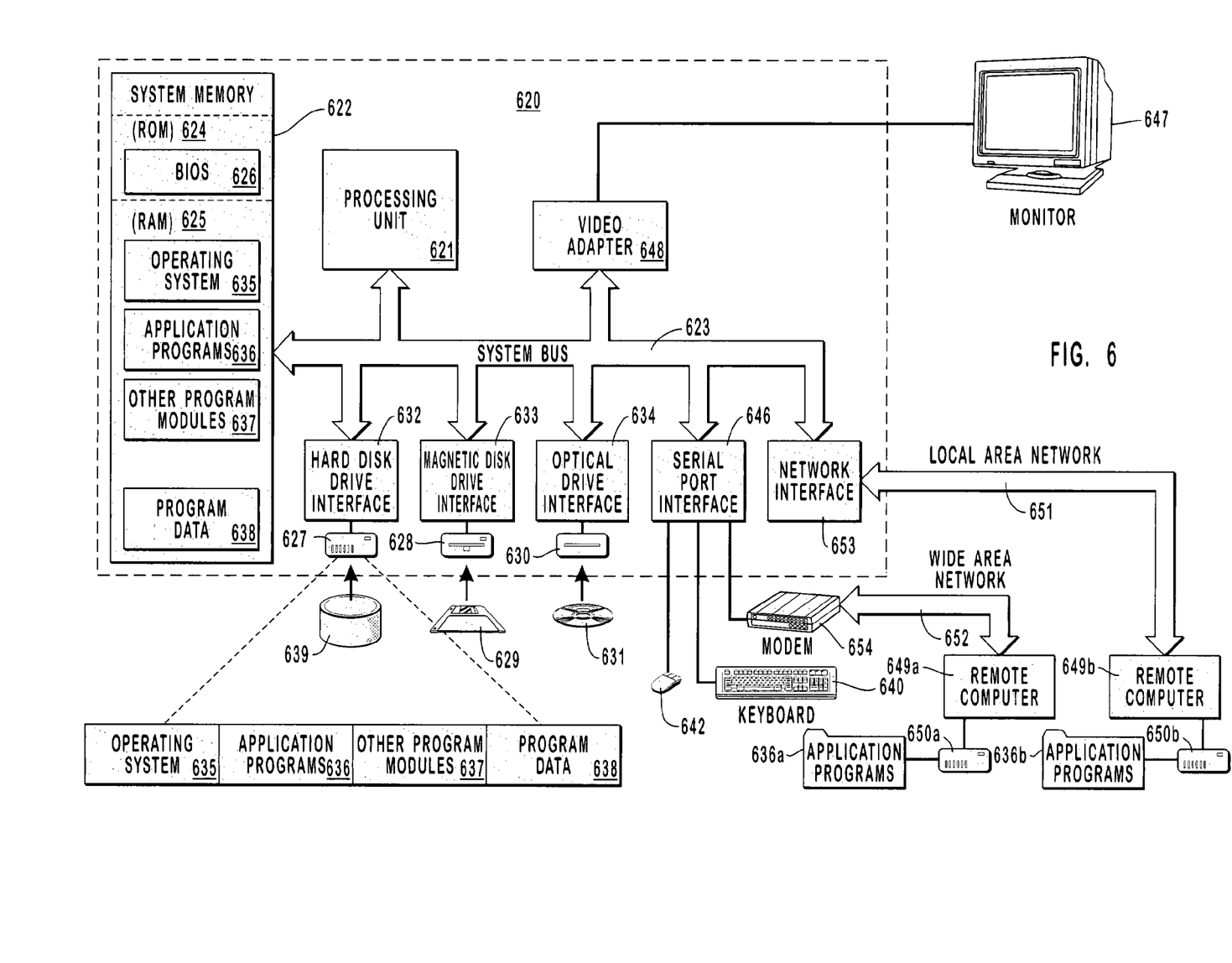
FIG. 6 illustrates an example system that provides a suitable operation environment for the present invention.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an example system for implementing the invention includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMS, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 847 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. Within a grid control for displaying a user interface comprising a table that is a visual representation of a database and that enables a user to read and interact with content of the database, wherein the grid control comprises a plurality of cell objects organized as a plurality of row objects and one or more column objects, wherein for each of the plurality of row objects, one or more user interface characteristics are stored in one or more row characteristic objects, a method of reducing memory requirements for the grid control by sharing a single row characteristic object between two or more row objects, the method comprising acts of:

creating a first row object that comprises one or more first cell objects, the first row object for use in organizing the one or more first cell objects and data associated with the one or more first cell objects for presentation within the grid control;

creating a second row object that comprises one or more second cell objects, the second row object for use in organizing the one or more second cell objects and data associated with the one or more second cell objects for presentation within the grid control;

creating a row characteristic object for use in determining how the data associated with the one or more first and second cell objects should be presented within the grid control;

creating an index to link the row characteristic object to the first and second row objects such that the row characteristic object is shared between the first and second row objects;

storing the data associated with each of the one or more first and second cell objects separately from the first and second cell objects where characteristic information for each corresponding cell object is located; and maintaining a state list with state information that is redundant with state information maintained for each row.

2. The method of claim 1, wherein the row characteristic object comprises presentation information for use in presenting the data associated with the one or more first and second cell objects, and wherein the presentation information is one or more of a row height, row styles or row states.

3. The method of claim 2, wherein the presentation information includes said row styles, and wherein the row styles include one or more of a row color, data color, data alignment, data wrapping, data font name, data font size or data font style.

4. The method of claim 2, wherein the presentation information includes said row states, and wherein the row states include one or more of a read-only, selected, resizable, frozen, enabled or visible, and wherein these states can be either turned on or off.

5. The method of claim 1, further comprising the act of:

creating one or more column objects associated with the one or more first and second cell objects, wherein a cell characteristic for each of the one or more first and second cell objects for use in presenting the data associated with the one or more first and second cell objects can be determined by either the row characteristic object or a column characteristic object.

6. The method of claim 5, wherein the row characteristic object comprises presentation information for use in presenting the data associated with the one or more first and second cell objects, and wherein the presentation information is one or more of a row height, row styles or row states.

7. The method of claim 5, wherein the cell characteristic includes said column characteristic object, and wherein the column characteristic object comprises presentation information for use in presenting the data associated with the one or more first and second cell objects, and wherein the presentation information is one or more of a column width, column styles or column states.

8. The method of claim 6, wherein the presentation information includes said row styles, and wherein the row styles include one or more of a row color, data color, data alignment, data wrapping, data font name, data font size or data font style.

9. The method of claim 6, wherein the presentation information includes said row states, and wherein the row states include one or more of a read-only, selected, resizable, frozen, enabled or visible, and wherein these states can be either turned on or off.

10. The method of claim 1, further comprising the act of: creating a states list that comprises first and second states for the first and second row objects, respectively.

11. The method of claim 10, wherein the first and second row states include one or more of a read-only, selected, resizable, frozen, enabled or visible, and wherein these states can be either turned on or off.

12. The method of claim 5, further comprising the act of: creating a states list that comprises first and second states for the first and second row objects, respectively.

13. The method of claim 12, wherein the first and second row states include one or more of a read-only, selected, resizable, frozen, enabled or visible, and wherein these states can be either turned on or off.

14. A method as recited in claim 1, wherein the method further comprises determining whether a row can be shared.

15. A method as recited in claim 14, wherein determining whether a row can be shared includes determining whether each individual cell within a collection of cells for a row object can be deduced from an owning column and an owning row object.

16. A method as recited in claim 14, wherein determining whether a row can be shared includes determining whether characteristics of the cells for a row are compatible.

17. A method as recited in claim 1, wherein the state list enables a state of a particular row having a shared row characteristic with another row characteristic of an other row to be changed without unsharing the row characteristics of the particular row and the other row.

18. A method as recited in claim 1, wherein the method further comprises unsharing a row that was previously shared through the link of the row characteristic object to the first and second row objects.

19. A method as recited in claim 18, wherein unsharing the row is initiated by a user request for an index to a row.

20. A method as recited in claim 18, wherein unsharing the row is initiated by a user request for a change to a characteristic of the row.

21. Within a grid control for displaying a user interface comprising a table that is a visual representation of a database and that enables a user to read and interact with content of the database, wherein the grid control comprises a plurality of cell objects organized as a plurality of row objects and one or more column objects, wherein for each of the plurality of row objects, one or more user interface characteristics are stored in one or more row characteristic objects, a method of reducing memory requirements for the grid control by sharing a single row characteristic object between two or more row objects, the method comprising steps for:

organizing one or more first cell objects and data associated with the one or more first cell objects within a first row object for presentation within the grid control;

organizing one or more second cell objects and data associated with the one or more second cell objects within a second row object for presentation within the grid control;

sharing a row characteristic object between the first and second row objects, wherein the row characteristic object is used in determining how the data associated with the one or more first and second cell objects should be presented within the grid control, and wherein an index is used to link the row characteristic object to the first row object and the second row object;

storing the data associated with each of the one or more first and second cell objects separately from the first and second cell objects where characteristic information for each corresponding cell object is located; and maintaining a state list with state information that is redundant with state information maintained for each row.

22. The method of claim 21, wherein the row characteristic object comprises presentation information for use in presenting the data associated with the one or more first and second cell objects, and wherein the presentation information is one or more of a row height, row styles or row states.

23. The method of claim 22, wherein the presentation information includes said row styles, and wherein the row styles include one or more of a row color, data color, data alignment, data wrapping, data font name, data font size or data font style.

24. The method of claim 22, wherein the presentation information includes said row states, and wherein the row states include one or more of a read-only, selected, resizable, frozen, enabled or visible, and wherein these states can be either turned on or off.

25. The method of claim 21, wherein the step for sharing comprises the act of:

creating one or more column objects associated with the one or more first and second cell objects, wherein a cell characteristic for each of the one or more first and second cell objects for use in presenting the data associated with the one or more first and second cell objects can be determined by either the row characteristic object or a column characteristic object.

26. The method of claim 25, wherein the row characteristic object comprises presentation information for use in presenting the data associated with the one or more first and second cell objects, and wherein the presentation information is one or more of a row height, row styles or row states.

27. The method of claim 25, wherein the cell characteristic includes said column characteristic object, and wherein the column characteristic object comprises presentation information for use in presenting the data associated with the one or more first and second cell objects, and wherein the presentation information is one or more of a column width, column styles or column states.

28. The method of claim 27, wherein the presentation information includes said column styles, and wherein the column styles include one or more of a row color, data color, data alignment, data wrapping, data font name, data font size or data font style.

29. The method of claim 27, wherein the presentation information includes said column states, and wherein the column states include one or more of a read-only, selected, resizable, frozen, enabled or visible, and wherein these states can be either turned on or off.

30. The method of claim 21, wherein the step for sharing comprises the act of:

creating a states list that comprises first and second states for the first and second row objects, respectively.

31. The method of claim 30, wherein the first and second row states include one or more of a read-only, selected, resizable, frozen, enabled or visible, and wherein these states can be either turned on or off.

32. The method of claim 27, wherein the step for sharing comprises the act of:

creating a states list that comprises first and second states for the first and second row objects, respectively.

33. The method of claim 32, wherein the first and second row states include one or more of a read-only, selected, resizable, frozen, enabled or visible, and wherein these states can be either turned on or off.

34. The computer program product of claim 33, wherein the first routine uses one or more column characteristic objects for creating the row characteristic object.

35. The computer program product of claim 33, wherein a states list is created that comprises states for the added row object.

36. A computer program product for use within a grid control for displaying a user interface comprising a table that is a visual representation of a database and that enables a user to read and interact with content of the database, wherein the grid control comprises a plurality of cell objects organized as a plurality of row objects and one or more column objects, wherein for each of the plurality of row objects, one or more user interface characteristics are stored in one or more row characteristic objects, wherein the computer program product comprises one or more computer-readable media having computer-executable instructions for implementing a method of reducing memory requirements for the grid control by sharing a single row characteristic object between two or more row objects, the method comprising acts of:

creating a first row object that comprises one or more first cell objects, the first row object for use in organizing the one or more first cell objects and data associated with the one or more first cell objects for presentation within the grid control;

creating a second row object that comprises one or more second cell objects, the second row object for use in organizing the one or more second cell objects and data associated with the one or more second cell objects for presentation within the grid control;

creating a row characteristic object for use in determining how the data associated with the one or more first and second cell objects should be presented within the grid control;

creating an index to link the row characteristic object to the first and second row objects such that the row characteristic object is shared between the first and second row objects; and storing the data associated with each of the one or more first and second cell objects separately from the first and second cell objects where characteristic information for each corresponding cell object is located; and maintaining a state list with state information that is redundant with state information maintained for each row.

37. The computer program product of claim 36, wherein the row characteristic object comprises presentation information for use in presenting the data associated with the one or more first and second cell objects, and wherein the presentation information is one or more of a row height, row styles or row states.

38. The computer program product of claim 37, wherein the method further comprises the act of:
creating one or more column objects associated with the one or more first and second cell objects, wherein a cell characteristic for each of the one or more first and second cell objects for use in presenting the data associated with the one or more first and second cell objects can be determined by either the row characteristic object or a column characteristic object.

39. The computer program product of claim 38, wherein the cell characteristic includes said column characteristic object, and wherein the column characteristic object comprises presentation information for use in presenting the data associated with the one or more first and second cell objects, and wherein the presentation information is one or more of a column width, column styles or column states.

40. The computer program product of claim 36, wherein the method further comprises the act of:
creating a states list that comprises first and second states for the first and second row objects, respectively.

41. A computer program product for use within a grid control for displaying a user interface comprising a table that is a visual representation of a database and that enables a user to read and interact with content of the database, wherein the grid control comprises a plurality of cell objects organized as a plurality of row objects and one or more column objects, wherein for each of the plurality of row objects, one or more user interface characteristics are stored in one or more row characteristic objects, wherein the computer program product comprises one or more computer-readable media having computer-executable instructions for implementing a method of reducing memory requirements for the grid control by sharing a single row characteristic object between two or more row objects, the method comprising steps for:
organizing one or more first cell objects and data associated with the one or more first cell objects within a first row object for presentation within the grid control;

organizing one or more second cell objects and data associated with the one or more second cell objects within a second row object for presentation within the grid control;

sharing a row characteristic object between the first and second row objects, wherein the row characteristic object is used in determining how the data associated with the one or more first and second cell objects should be presented within the grid control, and wherein an index is used to link the row characteristic object to the first row object and the second row object;

storing the data associated with each of the one or more first and second cell objects separately from the first and second cell objects where characteristic information for each corresponding cell object is located; and maintaining a state list with state information that is redundant with state information maintained for each row.

42. The computer program product of claim 41, wherein the row characteristic object comprises presentation information for use in presenting the data associated with the one or more first and second cell objects, and wherein the presentation information is one or more of a row height, row styles or row states.

43. The computer program product of claim 42, wherein the step for sharing comprises the act of:
creating one or more column objects associated with the one or more first and second cell objects, wherein a cell characteristic for each of the one or more first and second cell objects for use in presenting the data associated with the one or more first and second cell objects can be determined by either the row characteristic object or a column characteristic object.

44. The computer program product of claim 43, wherein the cell characteristic includes said column characteristic object, and wherein the column characteristic object comprises presentation information for use in presenting the data associated with the one or more first and second cell objects, and wherein the presentation information is one or more of a column width, column styles or column states.

45. The computer program product of claim 44, wherein the row states and column states include one or more of a read-only, selected, resizable, frozen, enabled or visible, and wherein these states can be either turned on or off.

46. The computer program product of claim 41, wherein the step for sharing comprises the act of:
creating a states list that comprises first and second states for the first and second row objects, respectively.

47. A computer program product with computer readable media carrying computer executable instructions that implements a grid control for displaying a user interface comprising a table that is a visual representation of a database and that enables a user to read and interact with content of the database, wherein the grid control comprises a plurality of cell objects organized as a plurality of row objects and one or more column objects, wherein for each of the plurality of row objects, one or more user interface characteristics are stored in one or more row characteristic objects, the computer program product used in reducing memory requirements for the grid control by sharing a single row characteristic object between a plurality row objects, the computer product comprising:
a first routine for creating a row characteristic object, wherein the row characteristic object includes user interface characteristics used in presenting data within one or more cells, and wherein the row characteristic object is associated with a particular row object;

a second routine for adding a row object to the grid control table, wherein the added row object shares the row characteristic object with the particular row object, which is compatible with characteristic information for all cell objects corresponding to the row object, such that the row characteristic object is used for presenting data within one or more cells of the added and particular rows, and wherein an index is created that links the row characteristic object to the added and particular row objects;

a routine for storing the data that is to be presented within the one or more cells separately from the cell objects where the characteristic information for each corresponding cell object is located; and a routine maintaining a state list with state information that is redundant with state information maintained for each row.

* * * * *